Aug. 5, 1969 M. F. HEILWEIL ET AL 3,459,926

GRAPHIC VECTOR GENERATOR

Filed Oct. 18, 1965 2 Sheets-Sheet 1

INVENTORS
MELVIN F. HEILWEIL
GERALD A. MALEY
GILBERT R. MUHLENBRUCH
STEWART OGDEN

BY John B. Frisone
ATTORNEY

United States Patent Office 3,459,926
Patented Aug. 5, 1969

3,459,926

GRAPHIC VECTOR GENERATOR

Melvin F. Heilweil and Gerald A. Maley, Poughkeepsie, and Gilbert R. Muhlenbruch, Wappingers Falls, N.Y., and Stewart Ogden, Louisville, Ky., assignors to International Business Machines Corporation, Armonk, N.Y., a corporation of New York Filed Oct. 18, 1965, Ser. No. 497,152
Int. Cl. G06f 1/02
U.S. Cl. 235—152 6 Claims

ABSTRACT OF THE DISCLOSURE

A vector generator for drawing a long vector as a series of digitally computed short vectors includes a register for storing the current position of the vector drawing device, on input for receiving new position data, an adder for determining the length of a vector to be drawn from the current to the new position, digital means for subdividing the determined vector length integrally according to its magnitude, and means for cumulatively adding in time sequence a quantity, equal to the subdivided part, to the current position storing register.

Figure 1:
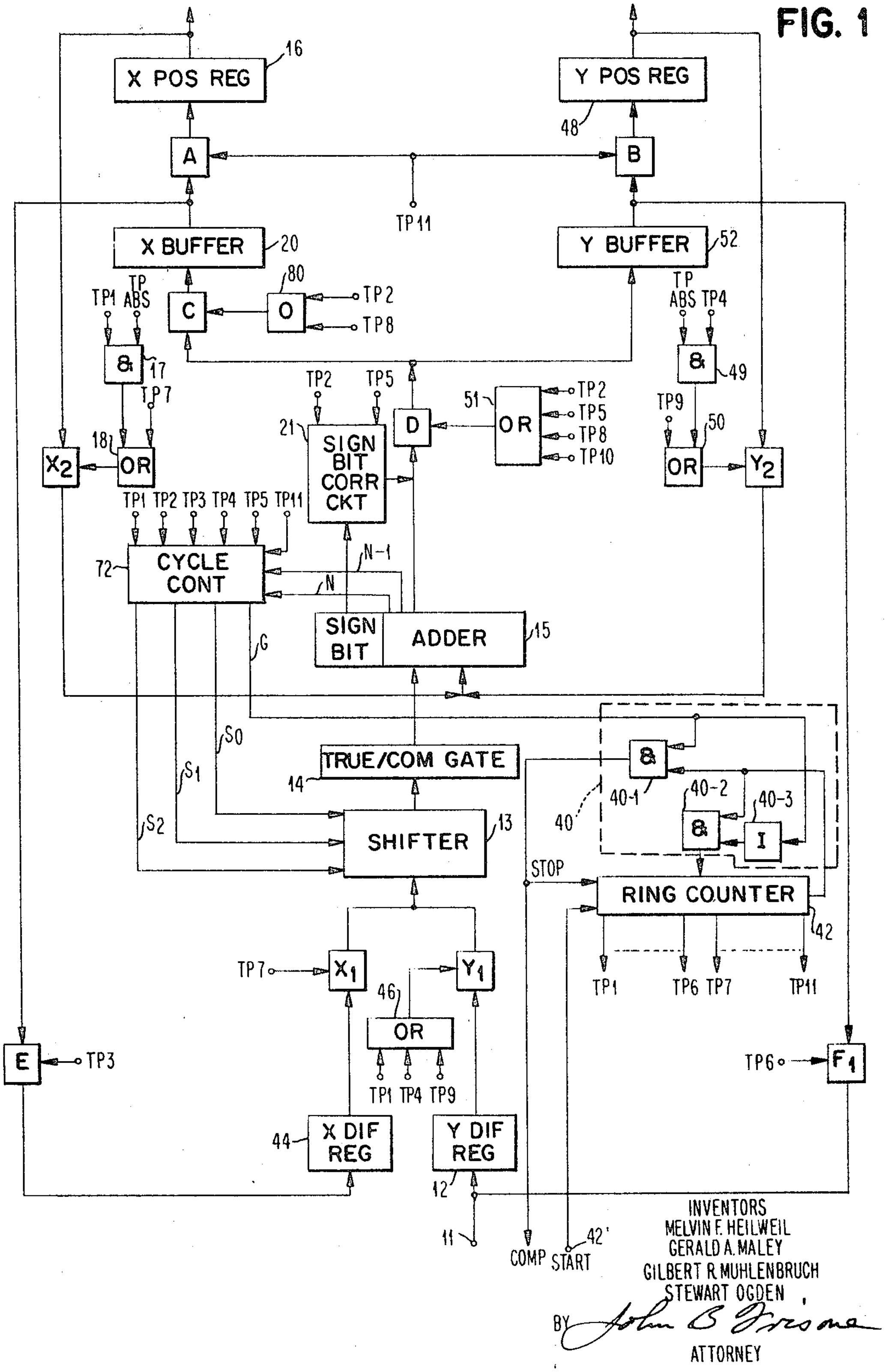

This invention relates to graphic display systems and more particularly, to a vector generator suitable for use in a digital computer controlled graphic display system.

Computer controlled graphic display systems utilizing cathode ray display tubes have been in use for some time. However, the display element, i.e.: the cathode ray tube and its associated deflection circuits impose a severe limitation on system operation. Linear deflections, in those instances where the X and Y components of the deflection are not equal or alternatively, where one component is not zero, can only be accomplished over relatively short distances with the aid of corrections in the deflection circuits. This fact constitutes a severe limitation on the system operation since it requires the generation of a plurality of substantially shorter lines to display a single elongated straight line.

In order to display the plurality of lines for generating a single straight line, the computer must have in storage data defining each of the segments constituting the line. Storage requirement, thus imposed, represents a substantial increase in systems cost and furthermore, introduces a delay in generation which increases total cost since the computer is tied up for longer periods of time and is, therefore, not free to disconnect from the display device to perform other processing functions.

One object of this invention is to provide a display system which is capable of executing linear deflections of any length from a single set of data defining the line.

Another object of the invention is to provide a vector generator which accepts a single set of data representing a straight line and generating one or more successive sets of data, each defining a line segment which, when produced in succession on a cathode ray display, provides the line defined by the single set of data supplied.

A further object of the invention is to provide a vector generator for a graphic display system which permits the computer controlling the system to designate any straight line, regardless of its length, by a single set of data.

Yet another object of the invention is to provide a vector generator which in response to a single set of data defining a vector provides, in time sequence, one or more vectors, depending on the length of the specified vector provided, which in combination equal the specified vector.

The invention contemplates a vector generator comprising: means for accepting data defining a specified vector, means for storing the current position of a reproducing device, means for determining the length of the specified vector and dividing specified vector length into a number of equal segments, the number being determined by the absolute length of the specified vector and means for cumulatively adding in time sequence the number of equal parts previously determined to the stored current position of the reproducing device.

The foregoing and other objects, features and advantages of the invention will be apparent from the following more particular description of the preferred embodiment of the invention as illustrated in the accompanying drawings.

Figure 2:
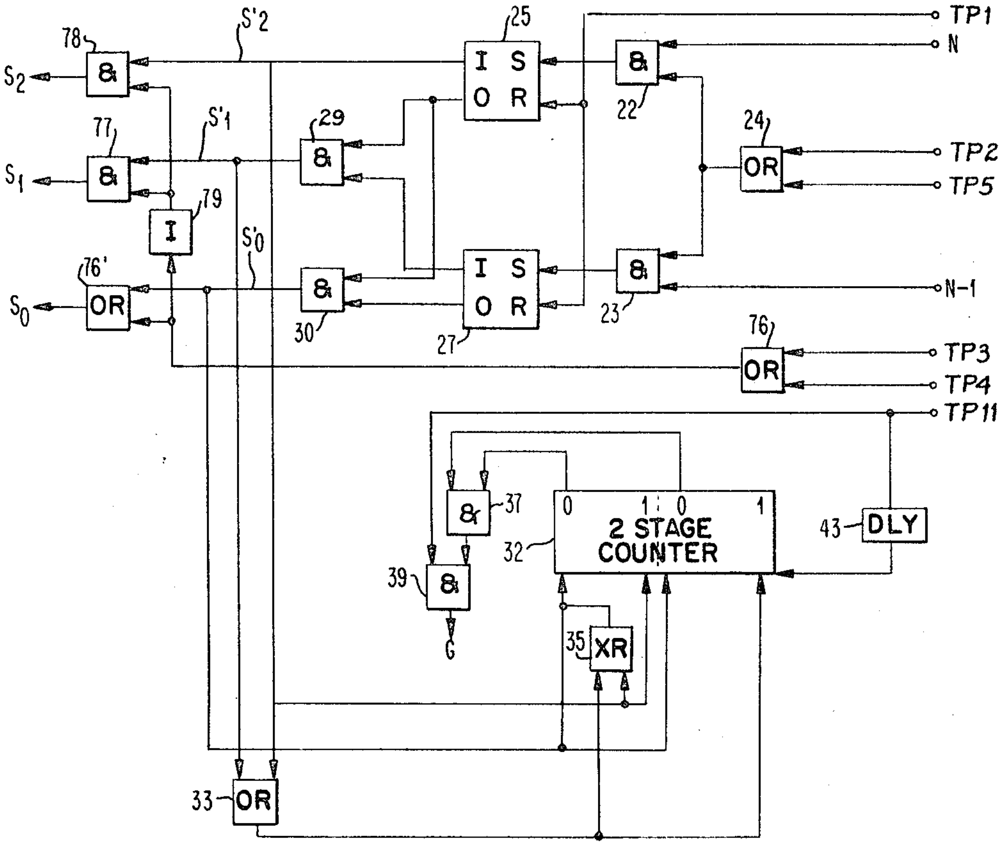
Figure 3:
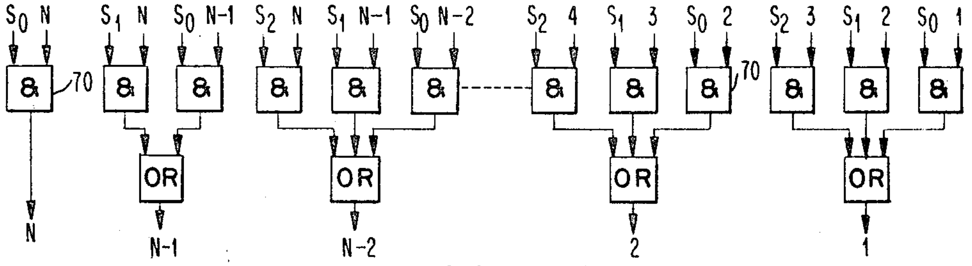
Figure 4:
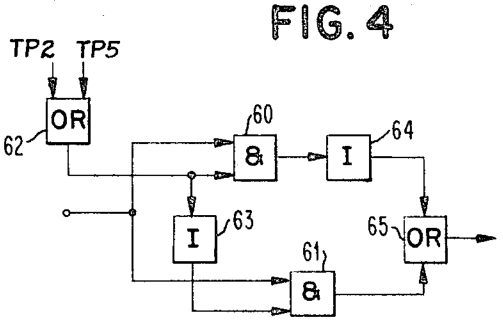

In the drawings:

FIGURE 1. is a block diagram of a vector generating system constructed according to the invention; and FIGURES 2 through 4, inclusive, are schematic diagrams of selected components illustrated in block form in FIGURE 1.

In FIGURE 1 a signal from the computer, not shown, is applied to a terminal 11. The signal is loaded into a register 12 which is designated in the drawings Y difference register. In this instance, the signal is a binary code identifying the X coordinate to which the beam of the cathode ray tube, also not shown, is to be deflected. This code is transmitted at a time 1 through a gate Y1 and applied through a shifter 13 and through a true complement gate 14 to one input of an adder 15. Operation of the device is controlled by a ring counter clock 42 which is started by a signal from the computer which is applied to a terminal 42'. Timing pulse 1 derived from ring counter clock 42 is applied via an OR circuit 46 to gate Y1. The other input of adder 15 is connected via a gate X2 to an X position register 16. Gate X2 is open at time 1 with the presence of an absolute vector mode signal supplied by the computer. Both the absolute vector mode control signal and timing pulse 1 are applied to an AND gate 17 and an OR gate 18 to control gate X2 at time 1. Before proceeding with the description, an explanation of the various modes in which the computer can operate, will be made.

The computer can supply signals in two formats, both signals define the vector to be drawn on the cathode ray tube. In the first instance, the signals may be supplied in an absolute format, that is, the X and Y coordinates supplied by the computer in binary form define the absolute end point values of the beam position. The computer may also specify the vector in the relative mode. In this mode, the X and Y signals supplied by the computer define the quantities in X and Y which must be added to the current X and Y positions in order to move the beam to the desired position.

Let it be assumed that the computer is in the absolute mode and is supplying X and Y signals in succession each of which define the absolute coordinates of the end point of the vector which is to be drawn on the cathode ray tube. The X binary coordinate from the computer which has been applied through register 12, shifter 13 and through true complement gate 14 is provided with a negative sign bit, that is to say, a 1 in the sign bit position which indicates a negative. Thus, the quantity supplied at terminal 11 will be complemented in gate 14 and added in 15 to the value supplied by the X position register 16. At time 2, timing pulse 2 will allow the algebraic sum of this addition to be passed through gates D and C to an X buffer 20. Timing pulse 2 is applied to gate a D via an OR gate 51 and to gate C via an OR gate 80.

At time 2, timing pulse 2 will also cause the sign bit to be corrected via the sign correction circuit before being passed through gates C and D to the X buffer. This is necessary since the sign of the difference must be inverted.

For example, if the beam is currently at position X9 an dis to be moved to the position X12, then subtracting 12 from 9 would produce the quantity minus three. However, 12 is greater than 9 and, therefore, 9 must be incremented by +3. Thus, the sign bit will be incorrect during this particular operation and sign correction circuit 21 connected to the sign bit output of adder 15 will be active during the second time pulse to correct the sign bit of the output of adder 15.

The two high order bits from adder 15 (N and N–1) are applied to a cycle control circuit 72 which is under the control of timing pulses 1–5 and 11. In the cycle control circuit, the details of which are shown in FIGURE 2, bits N and N–1 are examined to determine the magnitude of the X deflection. If the highest order bit position is a 1, this indicates that the deflection is greater than half screen. If the N–1 bit position is a 1 and the N position is a "0," this indicates that the deflection is between quarter and half screen length.

The circuit shown in FIGURE 2 illustrates how this particular situation is handled. The N bit is applied to an AND circuit 22 and the N–1 bit is applied to an AND circuit 23. Timing pulses 2 and 5 are applied through an OR circuit 24 to the other inputs of AND circuits 22 and 23. Timing pulse 1 is applied to the reset inputs of a pair of bistable flip flops 25 and 27 to reset these flip flops just prior to handling a new vector from the computer. If the N bit is 1 at time 2, flip flop 25 will be set causing a 1 output to appear on the lines $S'_2$. If the N–1 bit is a 1 at time 2, flip flop 27 will be set causing a 1 to be applied to an AND gate 29. If the N bit from adder 15 is a "0" and the N–1 bit is a "1," AND gate 29 will cause the line $S'_1$ to come up. If neither the N bit nor the N–1 bit are ones, then the "0" outputs of flip flops 25 and 27 will be up. These outputs are applied to AND gate 30 and cause a line $S'_0$ to come up which indicates that neither the N nor N–1 bits are 1. The $S'_0$, $S'_1$ and $S'_2$ bits are utilized for controlling shifter 13 and cause shifting on a subsequent operation which will be described later on. The $S'_0$ output is applied to the reset inputs of a two stage counter 32. The $S'_1$ and $S'_2$ outputs are applied through an OR circuit 33 to the set input of the first stage of the counter 32. The output of OR circuit 33 and the $S'_2$ output are applied to the inputs of an Exclusive OR circuit 35, the output of which is connected to the reset input of the second stage of counter 32. The $S'_2$ line is also connected to the set input of the second stage of the counter. Thus, if the $S'_2$ line is up, both the first and second stages of counter 32 will be set. If the $S'_1$ line is up, only the first stage will be set, the second stage will be reset, and if the $S'_0$ line is up, both stages will be reset. The zero outputs of the first and second stages, respectively, are connected to an AND circuit 37 which has its output connected to one input of an AND circuit 39. The other input of AND circuit 39 is connected to the timing pulse 11. The output of AND circuit 39 is used to control a switch 40 in the feedback path of a ring counter 42. A delay circuit 43 passes timing pulse 11 and the delayed pulse is utilized to step counter 32 down. Thus, when the value of counter 32 arrives at "0," an output G at coincidence with timing pulse 11 will be generated on the output of AND gate 39.

The pulse G from gate 39 is utilized to control the feedback path of ring counter 42. Ring counter 32 has 11 positions designated 1 through 11. The output can be fed back from 11 to 7 through switch 40 or alternatively, through switch 40 to stop the counter and signal completion depending on the state of gate 39. Thus, ring counter 42 is capable of supplying pulses 1 through 11 or 1 through 6 and 7 through 11 repetitively as determined by the count of counter 32. How this is utilized will become apparent as the description continues. Switch 40 includes a pair of AND gates 40–1 and 40–2, each connected to timing pulse 11 and conditioned by the signal G and $\overline{G}$, respectively. The signal $\overline{G}$ bar is generated by an inverter 40–3 connected to the output of AND gate 39. With this arrangement, as long as the signal G is down a feedback path is established which causes the counter 42 to repeat timing pulses 7–11, inclusive. As soon as G is up the next timing pulse 11 stops counter 42 and signals completion of the order, i.e. drawing of the line ordered on the cathode ray tube.

Thus far, the X coordinate has been introduced into the register 12 and the difference between the current X position of the beam and the new position has been determined in adder 15. This has been placed in buffer 20. At clock pulse 3, the quantity in X buffer 20 is inserted in the X difference register 44 through gate E, where it will remain until the Y difference has been determined. The determination of this Y difference will now be described.

The Y coordinate is applied to the Y difference register 12 and timing pulse 4, which is connected to gate Y1 via OR gate 46, causes the Y coordinates to be passed through shifter 13, which at this time does not shift the Y coordinate passing through, to the complement gate 14. Since the sign bit is again a 1, the true complement gate 14 complements the value. The complemented value is applied to one input of adder 15 and the value contained in the Y position register 48 is applied through gate Y2, which is under the control of the absolute mode signal and timing pulse 4 via an AND gate 49 and an OR gate 50, to the other input of adder 15. Here, the process is repeated to determine the difference and the sign bit corrected by sign correction circuit 21. At time 5, timing pulse 5 is applied via OR gate 51 to gate D, causing the difference value to be inserted in the Y buffer 52. At time 6, timing pulse 6 causes the contents of Y buffer 52 which is the difference between the Y position in register 48 and the Y coordinate of the new end point to be inserted in the Y difference register 12. Cycle control circuit 72 performs the same operation previously described for the processing of the X difference. However, in the event that the Y difference is greater than the X difference, the greater of the two will control the setting of counter 32 and the operation of shifter 13. The operation of shifter 13 will be described in conjunction with the description of FIGURE 3 and is deferred until later.

At time 7, timing pulse 7 causes the X difference in register 44 to be passed through gate X1 and inserted in shifter 13. If the N bit was 1, the quantity will be shifted two positions to the right to thus divide the quantity contained in register 44 by 4. Depending upon its sign, it would go through the gate 14 as a true value or as a complement value. The sign will indicate whether or not it must be added or subtracted to the quantity in the X position register. For example, if the X position was 9 and the beam is to be moved to 12, then the difference quantity will be added. The difference 3 will be added to the 9. The other input of adder 15 is connected via gate X2 to the X position register 16 which is gated in on timing pulse 7 applied to gate X2 via OR gate 18. The two quantities are added and on timing pulse 8 are inserted via gates D and C in the X buffer 20.

At time 9, timing pulse 9 causes the Y difference to pass via the Y1 gate through shifter 13 where it is shifted the same number of times that X was shifted and via true complement gate 14 to adder 15. Also at time 9, the contents of the Y position register 48 pass through gate Y2 into adder 15 where they are algebraically added. At time 10, timing pulse 10 causes the adder output to be transferred via gate D into the Y buffer 52. Thus, after termination of timing pulse 10 both the X buffer register 20 and the Y buffer register 52 contain the values of the X position register 16 and the Y position register 48 respectively plus the incremental quantity which the beam is to be moved. At time 11, timing pulse 11 causes the contents of these registers to be gated through gates A and B respectively into the X and Y position registers 16 and 48, respectively, where they are applied via digital to analog converting circuits, not shown, to the X and Y deflection circuits of the cathode ray tube to cause the beam to deflect.

Referring again to FIGURE 2, timing pulse 11 causes the counter 32 after a delay in circuit 43 to decrement by 1. This cycle, TP7–TP11, is repeated until the counter decrements to "0," at which point, it is repeated one more time and then goes through the major cycle which has just been described with a new set of coordinates which will be inserted from the computer as previously described.

Shifting circuit 13 comprises a plurality of AND gates 70 for each bit position. Three AND gates are provided for the N–2 and lower order bit positions. In each bit position, the $S_0$, $S_1$ and $S_2$ outputs of the cycle controller are connected to the first, second and third AND gates respectively. In the N–2 position, the N–2 and the $S_0$, the N–1 and the $S_1$, and the N and the $S_2$, respectively, are ANDed. Thus, the N–2 bit will be connected to the N–2 output of the shifter if the cycle controller $S_0$ line is up; the N–1 bit will be connected, if the cycle control line $S_1$ is up, and the N bit if the $S_2$ line is up. The N–1 and N position require two and one AND gates, respectively, since the N position will only have an output when $S_0$ is up and the N–1 position will only have an output when the $S_0$ and $S_1$ lines are up. Shifting is inhibited on the third and fourth timing pulses since during the third and fourth timing pulses, no shifting is required or necessary.

This function is accomplished by OR gate 76 connected to line $S'_0$ and AND gates 77 and 78 connected to lines $S'_1$ and $S'_2$, respectively, timing pulses three and four are applied via OR circuit 76 and 76' to force an $S_0$ condition during times three and four while inverter 79 inhibits gates 77 and 78 during this same time period to inhibit $S_1$ and $S_2$.

True complement gate 14 may comprise a plurality of Exclusive Or gates, one gate for each bit position controlled by the sign bit. Thus, if the sign bit is a 1, the gates will complement the bits and if the sign bit is a "0" the bits will go through unchanged.

Correction circuit 21 is shown in detail in FIGURE 4. The sign bit from adder 13 is applied to AND gates 60 and 61, timing bits 2 and 5 are applied via an OR gate 62 to AND gate 60 and via an inverter 63 to AND gate 61. The output of AND gate 60 is inverted by an inverter 64 and the outputs of AND gates 61 and inverter 64 are applied through an OR circuit 65 to gate D where it rejoins the output of adder 15. With this arrangement, on timing pulses 2 and 5, the sign bit is inverted via inverter 64 and at all other times the sign bit is passed via AND gate 61 and OR gate 65 in its uninverted form.

As previously set forth, the computer may supply signals in both the absolute format or in relative format. In the relative format, the difierence is supplied and need not be generated. Therefore, gates Y2 and X2 are inhibited during timing pulses 1 and 4 and a zero quantity is inserted in adder 15. Therefore, the X and Y values inserted in register 12 via the computer and sent through shifter 13, true complement gate 14 and adder 15 are subtracted from or added to zero, depending upon the sign bit, and, consequently, the unaltered $\Delta X$ and $\Delta Y$ values go through gates D and C to buffer 20 and via gate D to buffer 52, respectively. In both instances, the sign bit correction circuit 21 is employed. However, the sign bit supplied by the computer in the relative mode must be adjusted to reflect what is to be done with the difference, whether it is to be added or subtracted to the value in the X and Y position registers 16 and 48. If a subtraction is to take place, that is, if the new end point is less in either X or Y, than the presently attained X and Y coordinate of the beam, a subtraction must take place. Since sign inversion will take place at timing pulses 2 and 5, the sign bit "0" must be used since a 1 will be inserted at these points. If an addition is to take pace, sign bit 1 must be inserted. Here again, because an inversion will take place during timing bits 2 and 5. The same is true for the Y coordinate which will be in process a timing pulse 5.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A vector generator for use in a graphic display system comprising means for receiving data defining a vector, means for storing the current position of a reproducing device, means responsive to said data receiving means for determining the length of the vector and subdividing the vector integrally as a function of the order of magnitude of length of the vector, and means for cumulatively adding in time sequence a quantity equal to the subdivided vector part to the stored current position of the reproducing device.

2. A vector generator for use in computer controlled graphic display systems comprising, means for storing the X and Y coordinates of the current position of a reproducing device used in the display system, means for receiving the X and Y coordinates of the positions to which said reproducing device is to be moved to cause a display of a line extending between the point defined by the coordinates of the current position and the point defined by the received coordinates, means responsive to the received and stored coordinates for computing the relative X and Y distances of the line defined by the two said points, means for detecting the magnitudes of the relative distances, means responsive to said detector for dividing said relative distances as a function of the length of the longer of the two, and means for cumulatively adding in time sequence the respective subdivided components of the line to the stored X and Y coordinates.

3. A vector generator for use in a computer controlled graphic display system comprising:

means for storing the X and Y coordinates of the current position of a reproducing device used in the display system, means for receiving data defining the relative distances in the X and Y directions said reproducing device must be moved from the current position to display a desired line, means for detecting the magnitude of the relative distances, means responsive to the detector for dividing the said relative distances as a function of the length of the larger of the two, and means for cumulatively adding in time sequence the respective subdivided components of the line to the stored X and Y coordinates.

4. A vector generator for use in a computer controlled graphic display system comprising:

first and second register for storing the X and Y coordinates, respectively, of the current position of a reproducing device used in the display system, means for receiving the X and Y coordinates of the position to which said reproducing device is to be moved for causing a display of a line extending between the point defined by the coordinates of the current position and the point defined by the received coordinates, computing means responsive to the receiving means and the first and second registers for computing the relative X and Y distances of the line defined by the said points, third and fourth register means for receiving and storing the relative X and Y distances respectively, and control means responsive to the relative X and Y distances computed for controlling the subsequent operation of said computing means as a function of the magnitude of the larger of the relative X and Y distances for scaling downwardly the relative X and Y magnitudes stored in the third and fourth registers, respectively, by a factor ($n$) and cumulatively adding the scaled quantities, ($n$) times to the value of the first and second registers, respectively.

5. A vector generator for use in a computer controlled graphic display system comprising:

first and second registers for storing the X and Y coordinates, respectively, of the current position of a reproducing device used in the display system, third and fourth register means for receiving and storing data defining the relative distances in the X and Y directions said reproducing device must be moved from the current position to display a desired line, computing means, and control means responsive to the relative X and Y distances received for controlling the operation of said computing means as a function of the magnitude of the larger of the two for dividing the relative X and Y magnitudes stored in the third and fourth register means, respectively, by a number ($n$) and cumulatively adding the divided quantities ($n$) times to the value of the first and second registers, respectively.

6. A vector generator for use in a graphic display system comprising, means for receiving data defining a vector, means for storing the current position of a reproducing device, means responsive to the current position and the vector defining data for producing signals defining vector segments, counter means responsive to said vector defining data for providing a predetermined count, and means responsive to said counter means for controlling said vector segment signal producing means to produce a number of substantially equal vector segment defining signals corresponding to said predetermined count.

References Cited

UNITED STATES PATENTS

| | | | |
|---|---|---|---|
| 3,325,802 | 6/1967 | Bacon | 340—324 |
| 3,333,147 | 7/1967 | Henderson | 340—324.1 XR |
| 3,337,860 | 8/1967 | O'Hara | 340—324.1 |
| 3,346,853 | 10/1967 | Hoster et al. | 340—172.5 |

MALCOLM A. MORRISON, Primary Examiner

ROBERT W. WEIG, Assistant Examiner

U.S. Cl. X.R.

340—324